United States Patent
Shiina et al.

(10) Patent No.: US 9,734,406 B2
(45) Date of Patent: Aug. 15, 2017

(54) INFORMATION PROCESSING DEVICE, INFORMATION PROCESSING METHOD AND PROGRAM

(75) Inventors: Hiroki Shiina, Kanagawa (JP); Kenichi Mizukami, Kanagawa (JP); Toshihiro Ishizaka, Tokyo (JP); Hiroshi Jinno, Kanagawa (JP)

(73) Assignee: Sony Corporation, Tokyo (JP)

( * ) Notice: Subject to any disclaimer, the term of this patent is extended or adjusted under 35 U.S.C. 154(b) by 971 days.

(21) Appl. No.: 12/655,926

(22) Filed: Jan. 11, 2010

(65) Prior Publication Data

US 2011/0170841 A1 Jul. 14, 2011
US 2016/0162737 A9 Jun. 9, 2016

(30) Foreign Application Priority Data

Jan. 14, 2009 (JP) .................................. 2009-006082

(51) Int. Cl.
*G06K 9/00* (2006.01)
*G11B 27/28* (2006.01)
*G11B 27/031* (2006.01)
*H04N 9/82* (2006.01)
*G06T 7/00* (2017.01)
*G06T 7/77* (2017.01)

(52) U.S. Cl.
CPC ............ *G06K 9/00744* (2013.01); *G06T 7/77* (2017.01); *G11B 27/031* (2013.01); *G11B 27/28* (2013.01); *H04N 9/8205* (2013.01)

(58) Field of Classification Search
CPC .. H04N 5/23296; H04N 13/0497; H04N 7/18; H04N 7/181; G06T 2207/30241; G06K 9/32; G01C 11/02; G01S 5/0009

USPC .......................... 348/143–172; 386/278–290
See application file for complete search history.

(56) References Cited

U.S. PATENT DOCUMENTS

| | | | | |
|---|---|---|---|---|
| 7,839,431 B2* | 11/2010 | Swarr et al. | .................... | 348/95 |
| 7,953,277 B2* | 5/2011 | Williams et al. | ............. | 382/173 |
| 2003/0165333 A1* | 9/2003 | Shinohara | ....................... | 396/72 |
| 2004/0155958 A1* | 8/2004 | Lee | ......................... | H04N 7/18 348/143 |

(Continued)

FOREIGN PATENT DOCUMENTS

| | | |
|---|---|---|
| CN | 1881994 A | 12/2006 |
| JP | 10224736 A | 8/1998 |

(Continued)

OTHER PUBLICATIONS

Office Action from Japanese Application No. 2009-006082, dated Dec. 21, 2010.

*Primary Examiner* — Gelek W Topgyal
(74) *Attorney, Agent, or Firm* — Chip Law Group

(57) ABSTRACT

An information processing device, which includes: a data holding section which holds first time-series data of an operation parameter which varies through a predetermined capturing operation; a data comparing section which compares second time-series data of the operation parameter with the first time-series data, the second time-series data being correlated with a moving image recorded through an actual capturing operation and varying through the actual capturing operation; and a data area specifying section which specifies, among the second time-series data, a data area corresponding to the first time-series data on the basis of the comparison of the first and second time-series data.

12 Claims, 16 Drawing Sheets

| NO. | COMPARATIVE OPERATING INFORMATION 1 | COMPARATIVE OPERATING INFORMATION 2 | ... | ... |
|---|---|---|---|---|
| PANNING PATTERN | | | ... | ... |
| TILTING PATTERN | | NOT CONSIDERED | ... | ... |
| DOLLYING PATTERN | NOT CONSIDERED | NOT CONSIDERED | ... | ... |
| ZOOMING PATTERN | NOT CONSIDERED | NOT CONSIDERED | ... | ... |

(56) References Cited

U.S. PATENT DOCUMENTS

| | | | |
|---|---|---|---|
| 2004/0165061 A1* | 8/2004 | Jasinschi et al. | 348/42 |
| 2005/0007553 A1* | 1/2005 | Romanoff et al. | 352/243 |
| 2010/0085437 A1* | 4/2010 | Troy et al. | 348/211.7 |
| 2010/0238262 A1* | 9/2010 | Kurtz et al. | 348/14.01 |
| 2010/0245532 A1* | 9/2010 | Kurtz et al. | 348/14.03 |
| 2011/0229110 A1* | 9/2011 | Sugihara | 386/278 |

FOREIGN PATENT DOCUMENTS

| | | | |
|---|---|---|---|
| JP | 2006332789 A | 12/2006 | |
| JP | 2007-013479 A | 1/2007 | |
| JP | 2008005204 A | 1/2008 | |
| WO | WO2009019774 | * 2/2009 | H40N 5/781 |

* cited by examiner

FIG. 9
| NO. | COMPARATIVE OPERATING INFORMATION 1 | COMPARATIVE OPERATING INFORMATION 2 | ... | ... |
|---|---|---|---|---|
| PANNING PATTERN |  | 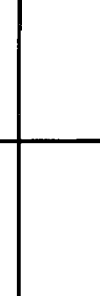 | ... | ... |
| TILTING PATTERN | 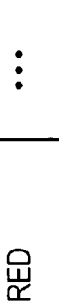 | NOT CONSIDERED | ... | ... |
| DOLLYING PATTERN | NOT CONSIDERED | NOT CONSIDERED | ... | ... |
| ZOOMING PATTERN | NOT CONSIDERED | NOT CONSIDERED | ... | ... |

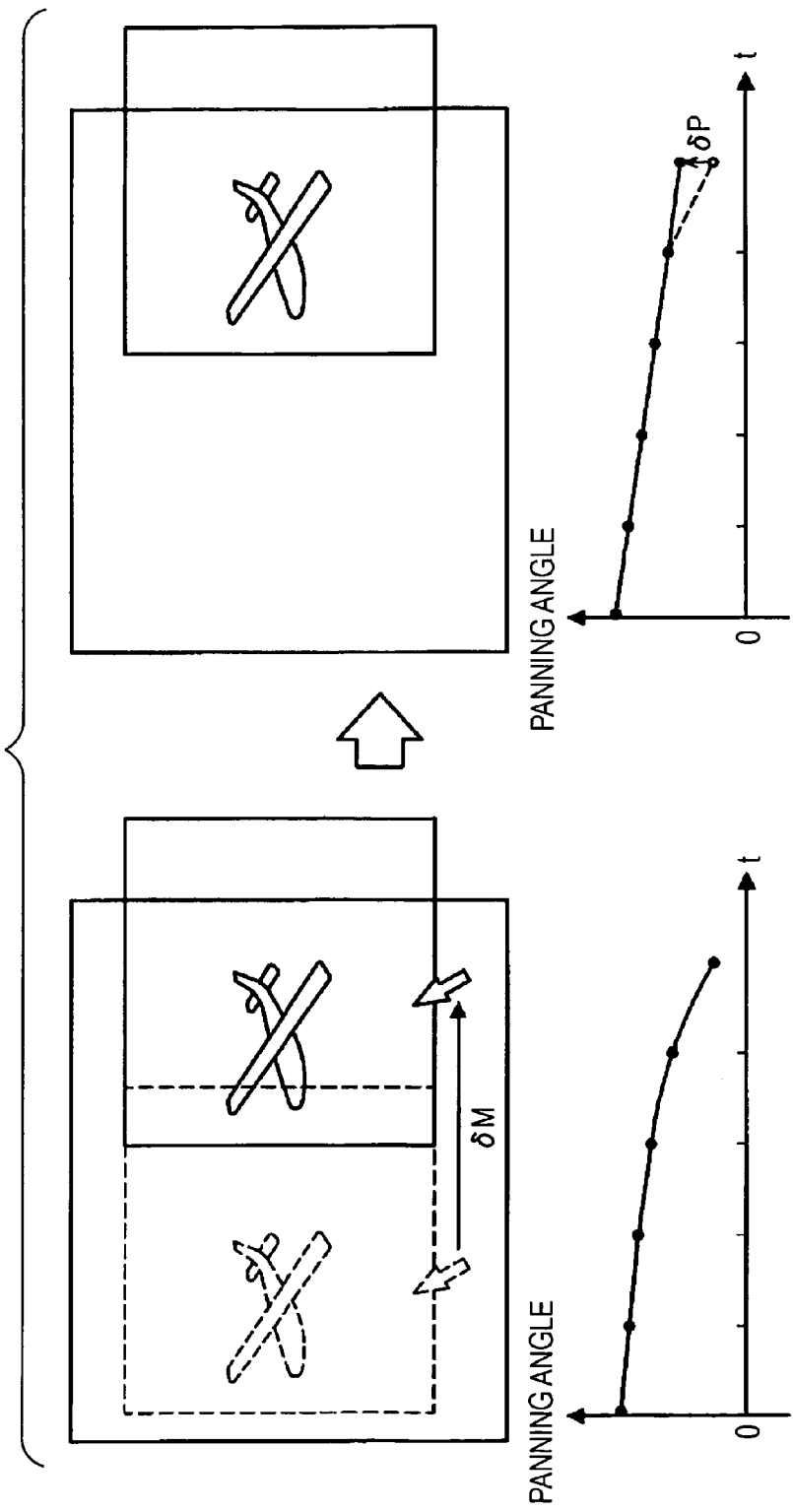

INFORMATION PROCESSING DEVICE, INFORMATION PROCESSING METHOD AND PROGRAM

CROSS REFERENCE TO RELATED APPLICATIONS

The present application claims priority to and claims benefit from Japanese Priority Patent Application JP 2009-006082 filed in the Japan Patent Office on Jan. 14, 2009, the entire content of which is hereby incorporated by reference.

BACKGROUND OF THE INVENTION

1. Field of the Invention

The present invention relates to an information processing device, an information processing method and a program.

2. Description of the Related Art

When editing a moving image, a user has to search for and specify a captured scene (or a captured shot) of interest to be reproduced or clipped. The user views the fast-reproduced moving image and specifies a recorded area corresponding to the captured scene of interest in the moving image. It is difficult, however, to specify a recorded area of a long-duration moving image to be edited.

Japanese Unexamined Patent Application Publication No. 2007-13479 discloses a technique for automatically specifying a recording area corresponding to starting and ending points of a specific capturing operation, such as panning, tilting and zooming, implemented on a recording device. With the disclosed method, editing efficiency is improved since a recorded area of a moving image can be specified easily.

SUMMARY OF THE INVENTION

A recorded area of a moving image specified in accordance with a starting point and an ending point of a capturing operation does not necessarily correspond to a recorded area of a moving image corresponding to a captured scene of interest. There is thus a problem that editing efficiency may not be able to be improved.

It is therefore desirable to provide a novel and improved information processing device, a novel and improved information processing method and a novel and improved program which can easily specify a recorded area of a moving image corresponding to a captured scene of interest.

A first embodiment of the invention is an information processing device, which includes: a data holding section which holds first time-series data of an operation parameter which varies through a predetermined capturing operation; a data comparing section which compares second time-series data of the operation parameter with the first time-series data, the second time-series data being correlated with a moving image recorded through an actual capturing operation and varying through the actual capturing operation; and a data area specifying section which specifies, among the second time-series data, a data area corresponding to the first time-series data on the basis of the comparison of the first and second time-series data.

According to the configuration, first time-series data of an operation parameter representing a predetermined capturing operation is compared with second time-series data of the operation parameter representing an actual capturing operation and a data area of the second time-series data which corresponds to the first time-series data is specified. With this configuration, the recorded area of the moving image correlated with the second time-series data of the specified data area is specified as a recorded area of the moving image recorded through the predetermined capturing operation. A user can therefore easily specify the recorded area of the moving image which corresponds to a captured scene of interest by having the information processing device to hold the first time-series data representing the predetermined capturing operation performed to record the captured scene of interest.

The data area specifying section may specify, among the second time-series data, a data area included in tolerance of the first time-series data on the basis of a comparison of the first time-series data and the second time-series data.

The tolerance of the first time-series data may be determined arbitrarily.

The data comparing section may compare the second time-series data with the first time-series data during recording a moving image to be recorded through an actual capturing operation or after the moving image is recorded through the actual capturing operation.

The data holding section may hold first time-series data which includes a plurality of operation parameters; the data comparing section may compare the second time-series data which includes the plurality of the operation parameters with the first time-series data which includes the plurality of operation parameters; and the data area specifying section may specify, among the second time-series data which includes the plurality of operation parameters, a data area which corresponds to the first time-series data including the plurality of the operation parameters.

The information processing device may further include a data generating section which generates, on the basis of the second time-series data of the operation parameter which is correlated with the moving image recorded through the actual capturing operation and varies through the actual capturing operation, first time-series data of the operation parameter which varies through the predetermined capturing operation.

The information processing device may further include a recording section which stores the second time-series data of the operation parameter which varies through the actual operation in correlation with the moving image recorded through the actual capturing operation.

The operation parameter may be varied in accordance with one of panning, tilting, dollying and zooming.

A second embodiment of the invention is an information processing method that can be applied to the information processing device according to the first embodiment.

A third embodiment of the invention is a program which allows a computer to execute the information processing method according to the second embodiment.

According to the invention, an information processing device, an information processing method and a program which can easily specify a recorded area of a moving image corresponding to a captured scene of interest can be provided.

BRIEF DESCRIPTION OF THE DRAWINGS

FIG. 9 illustrates a data structure of comparative operation information;

FIG. 12 illustrates a process of generating comparative operation information during recording a moving image;

DESCRIPTION OF THE PREFERRED EMBODIMENTS

Figure 1:
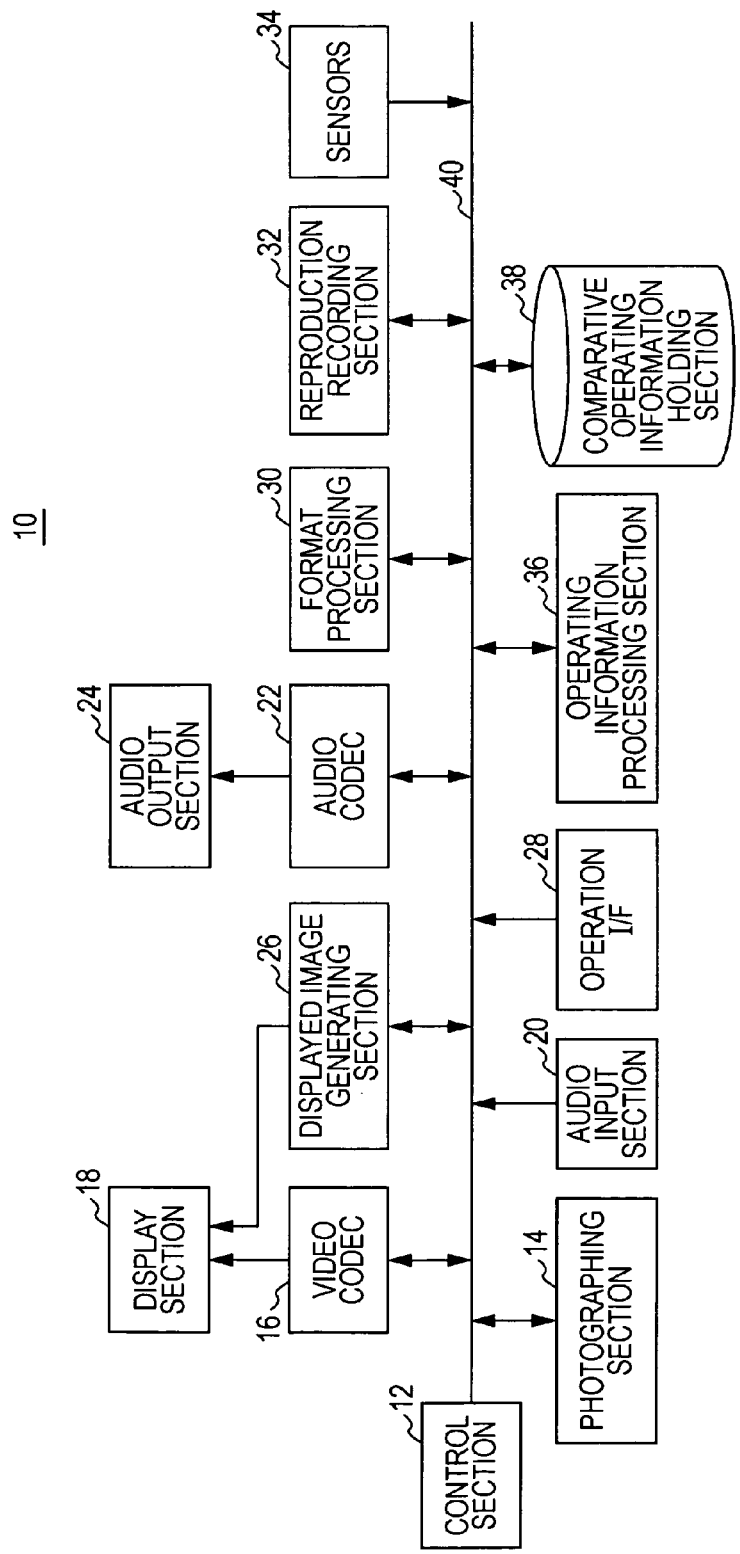
FIG. 1 is a block diagram illustrating a configuration of a video camera according to an embodiment of the invention.

Preferred embodiments of the invention will be described in detail with reference to the attached drawings. In the specification and the drawings, components having substantially the same functional configuration are denoted by the same reference numeral and description thereof will be omitted.

1. Configuration of Information Processing Device

First, a configuration of an information processing device according to an embodiment of the invention will be described with reference to FIG. 1. The information processing device may be a0 device that can record and/or reproduce moving images, such as a video camera, a still camera or a mobile phone. In the following description, a video camera 10 which can record and reproduce a moving image is exemplified as the information processing device.

As illustrated in FIG. 1, the video camera 10 includes a control section 12, an image-capturing section 14, a video codec 16, a display section 18, an audio input section 20, an audio codec 22, an audio output section 24, a display image generating section 26, an operation I/F 28, a format processing section 30, a reproduction/recording section 32, a sensors 34, an operation information processing section 36 and a comparative operation information holding section 38.

The control section 12 includes a CPU, a ROM and a RAM. The control section 12 executes processes necessary for the operation of the video camera 10 and controls each component connected via a bus 40. The CPU reads a program from the ROM and develops and executes the program from the RAM.

The image-capturing section 14 includes an image-capturing lens, an image sensor and a lens driving mechanism. The image-capturing section 14 converts light from an object into electrical signals and outputs the signals to the video codec 16 as video information. The image-capturing section 14 also drives the image-capturing lens by using the operation I/F 28 to allow zooming to be performed using the image-capturing lens.

The video codec 16 encodes the video information input from the image-capturing section 14 into video data, such as MPEG and Advanced Video Coding (AVC), and outputs the encoded data to the format processing section 30. The video codec 16 decodes the video data input from the format processing section 30 into video signals and outputs the signals to the display section 18. The video codec 16 outputs, to the operation information processing section 36, a motion vector in the video data acquired through encoding. The display section 18 may be a liquid crystal panel. The display section 18 outputs a video in accordance with the video signals input from the video codec 16 and an image to be displayed input from the display image generating section 26.

During generation of comparative operation information, the display image generating section 26 generates data regarding the image to be displayed, such as a temporarily stopped moving image and time-series data of an operation parameter, and outputs the generated data to the display section 18. The operation I/F 28 includes an operation button and an operation key and outputs an operation signal through user operation to the control section 12 and other sections. The operation I/F 28 includes a zoom lever for zooming and outputs, to the operation information processing section 36, a detected zooming value which varies through operation of the zoom lever.

The audio input section 20 may be a microphone which converts audio input from the object into audio signals and outputs the signals to the audio codec 22 as audio information. The audio codec 22 encodes the audio information input from the audio input section 20 into audio data, such as Advanced Audio Coding (AAC) and outputs the data to the format processing section 30. The audio codec 22 decodes the audio data input from the format processing section 30 into audio signals and outputs the signals to the audio output section 24. The audio output section 24 may be a speaker which outputs the audio corresponding to the audio signals input from the audio codec 22.

During recording of the moving image, the video data is input to the format processing section 30 from the video codec 16, the audio data is input to the format processing section 30 from the audio codec 22 and operation information, described later, is input to the format processing section 30 from the operation information processing section 36. The format processing section 30 generates predetermined moving image data from the video data, the audio data and the operation information and outputs the generated data to the reproduction/recording section 32. The moving image data is generated such that the operation information is correlated with the video data and the audio data in synchronization with the video data and the audio data. The format processing section 30 receives recorded area information, described later, from the operation information processing section 36 and outputs the received data to the reproduction/recording section 32.

During specification of the recorded area of the moving image, the format processing section 30 extracts operation information from the moving image data input from the reproduction/recording section 32 and outputs the operation data to the operation information processing section 36. During generation of the comparative operation information, the format processing section 30 generates the moving image data which includes comparative operation information as in information regarding the recording of the moving image or the specifying of the recorded area and extracts the comparative operation information from the moving image data. The reproduction/recording section 32 writes the moving image data input from the format processing section 30 in the recording medium and outputs the moving image data read from the recording medium to the format processing section 30. The format processing section 30 and the reproduction/recording section 32 together function as a data recording section.

The sensors 34 may be acceleration sensors, angular velocity sensors, gravity sensors or direction sensors. The sensors 34 detect an acceleration value, an angular velocity value, a gravity value, a direction or other information that varies through a capturing operation implemented on the video camera 10 and outputs the detected information to the operation information processing section 36.

Figure 2:
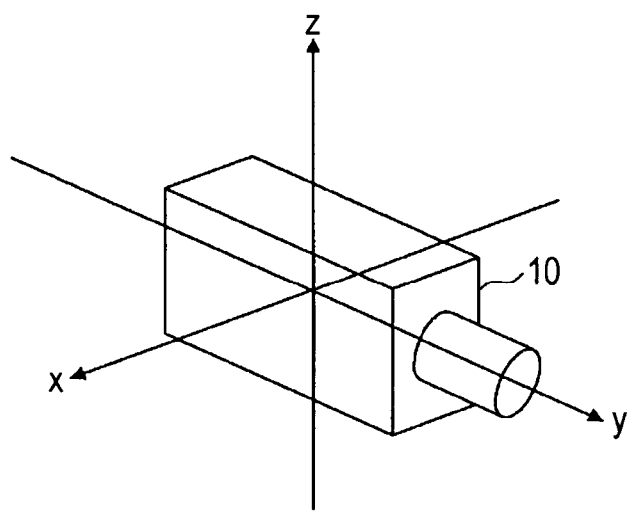
FIG. 2 describes a detected value for generating operation information.

Referring now to FIG. 2, the values detected by the sensors 34 will be described. As illustrated in FIG. 2, it is supposed that the direction of the optical axis of the lens is the Y-axis, the direction perpendicular to the Y-axis and corresponding to the horizontal direction of the video camera 10 is the X-axis and the direction perpendicular to both the X-axis and the Y-axis and corresponding to the vertical direction of the video camera 10 is the Z-axis. The acceleration sensors detect, for example, a capturing operation in which the video camera 10 is moved in the directions of the X-axis, the Y-axis and the Z-axis. The angular velocity sensors detect, for example, a capturing operation in which the video camera 10 is rotated about each of the X-axis, the Y-axis and the Z-axis.

During recording of the moving image, the operation information processing section 36 acquires and analyzes data for generating operation information and generates operation information. The operation information processing section 36 then specifies a recorded area of the moving image corresponding to the predetermined captured scene on the basis of a comparison of the operation information and the comparative operation information and generates recorded area information which represents the specified recorded area. The operation information processing section 36 outputs the operation information and the recorded area information to the format processing section 30.

The operation information includes time-series data of the operation parameters, such as a panning angle, a tilting angle, a dollying speed and a zoom factor, which vary through the capturing operation implemented on the video camera 10, such as panning, tilting, dollying and zooming. In the video camera 10 according to the present embodiment, the operation information processing section 36 analyzes the detected values of acceleration, angular velocity, gravity and direction, input from the sensors 34 and the detected value of zooming input from the operation I/F 28. The operation information processing section 36 then generates the operation information on the basis of analysis results of the detected values. The comparative operation information includes time-series data of the operation parameter which varies through the predetermined capturing operation implemented on the video camera 10.

During generation of the operation information, the operation information regarding the panning angle is generated from the detected value of the rotational speed on the X-Y plane and the operation information regarding the tilting angle is generated from the detected value of the rotational speed on the Y-Z plane. Operation information about the dollying speed is generated from the detected value of acceleration in the direction of the Y-axis. Operation information about the zoom factor is generated from the detected value of zooming. Note that the operation information may be operation parameters representing operations which include arbitrary combinations of positions, speed, acceleration, directions, angular velocity and angular acceleration with respect to the X-axis, the Y-axis and the Z-axis in addition to panning, tilting, dollying and zooming.

During specification of the recorded area of the moving image, the operation information processing section 36 compares the operation information and the comparative operation information which are input from the format processing section 30 and outputs, to the format processing section 30, the recorded area information which represents the recorded area specified on the basis of the comparison. During generation of the comparative operation information, the operation information processing section 36 acquires and analyzes data for generating the comparative operation information, generates the comparative operation information and outputs both the comparative operation information and generating section information to the format processing section 30. The generating section information herein is for specifying a generating section of the comparative operation information, which will be described later in detail. The operation information processing section 36 functions as a data comparing section, a data area specifying section and a data generating section.

The comparative operation information holding section 38 may be a memory which stores the comparative operation information generated by the user or the video camera 10. The comparative operation information holding section 38 also holds information about tolerance of the comparative operation information along with the comparative operation information. The comparative operation information holding section 38 functions as a data holding section.

Figure 3:
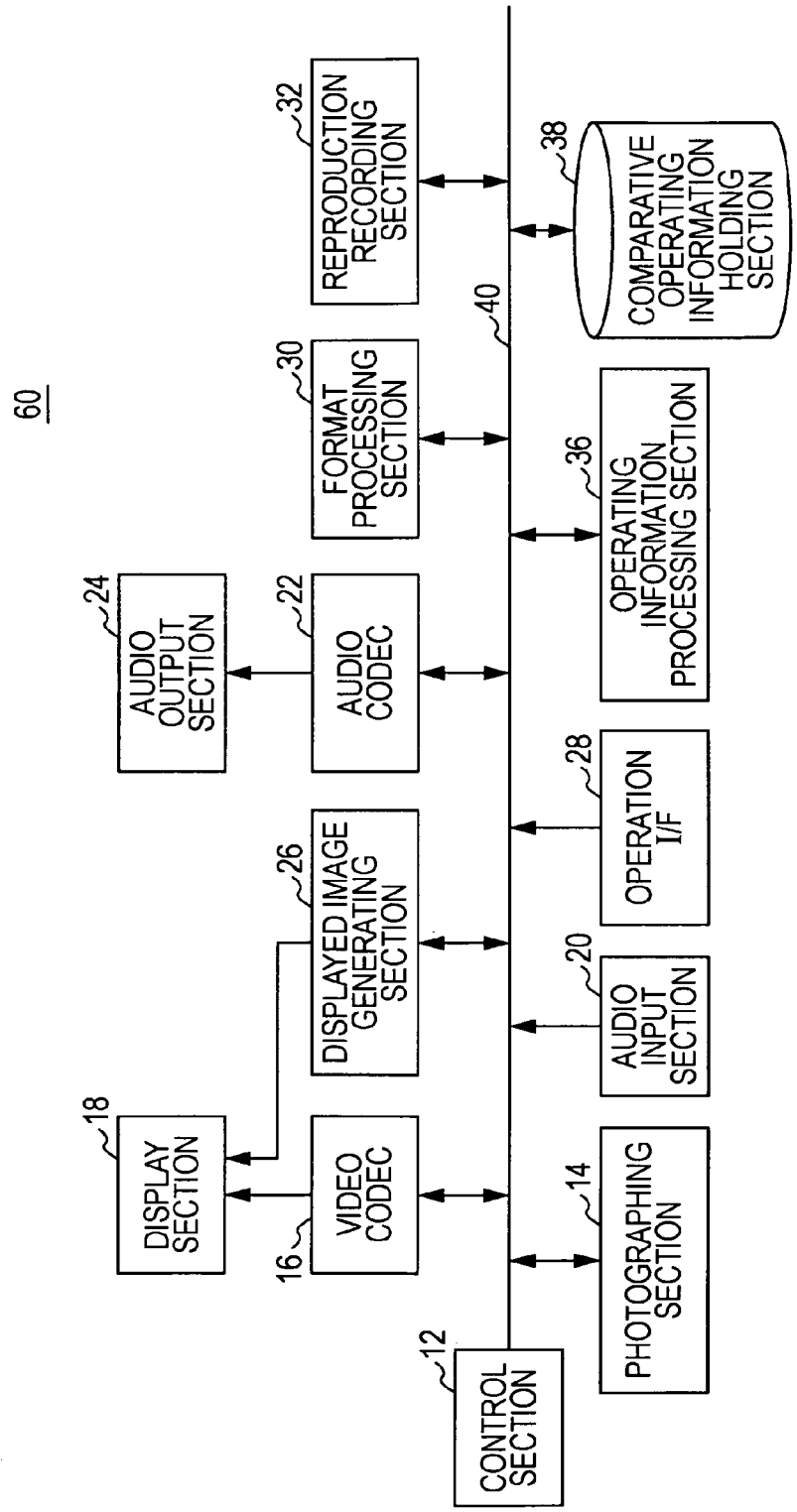
FIG. 3 is a block diagram illustrating a configuration of a video camera according to a modified embodiment of an embodiment of the invention.

Next, a configuration of a video camera 60 according to a modified embodiment of an embodiment of the invention will be described with reference to FIG. 3. As illustrated in FIG. 3, the video camera 60 has the same configuration as that of the video camera 10 described above except that the sensors 34 are omitted. During recording of the moving image, an operation information processing section 36 analyzes a detected zooming value input from an operation I/F 28. The operation information processing section 36 analyzes a motion vector in the video data (i.e., video stream data, such as MPEG) input from a video codec 16 and generates operation information on the basis of the analysis result of the detected value and the video data.

2. Method of Specifying Recorded Area

Figure 4:
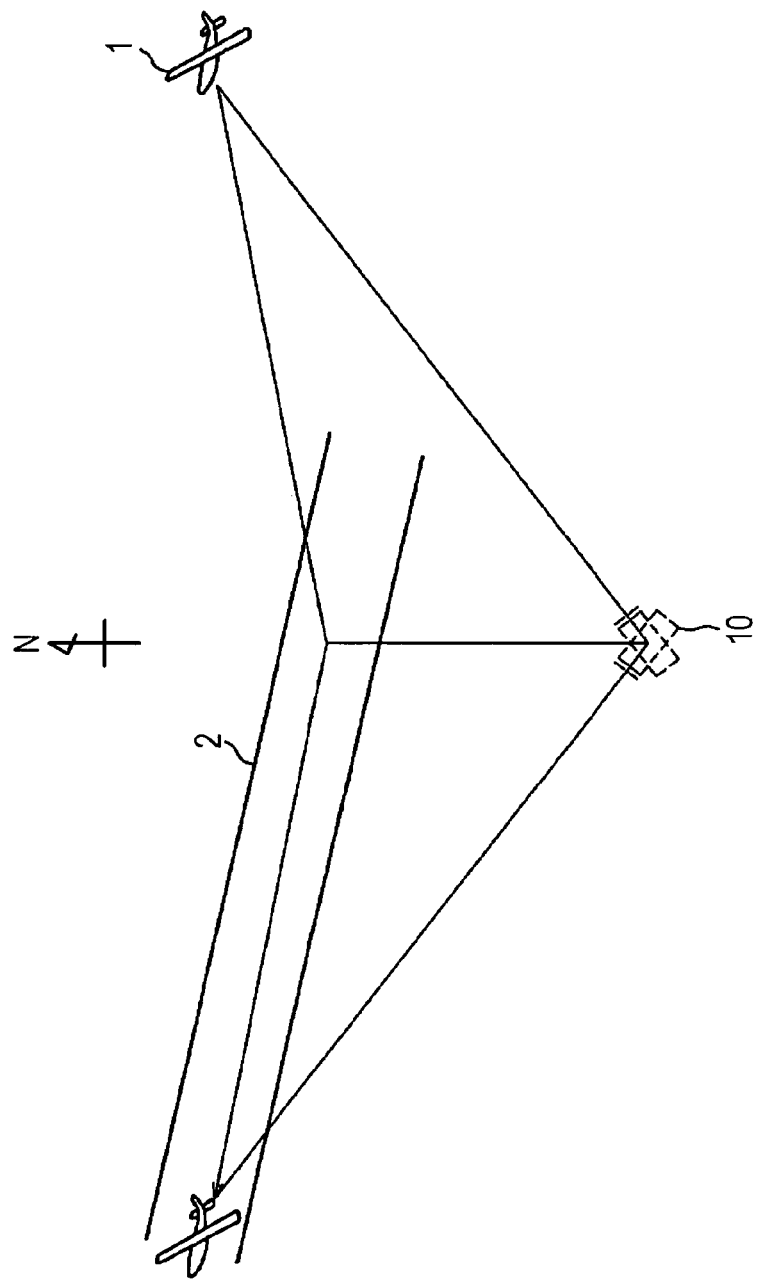
FIG. 4 illustrates a positional relationship of a video camera and an object.
Figure 5:
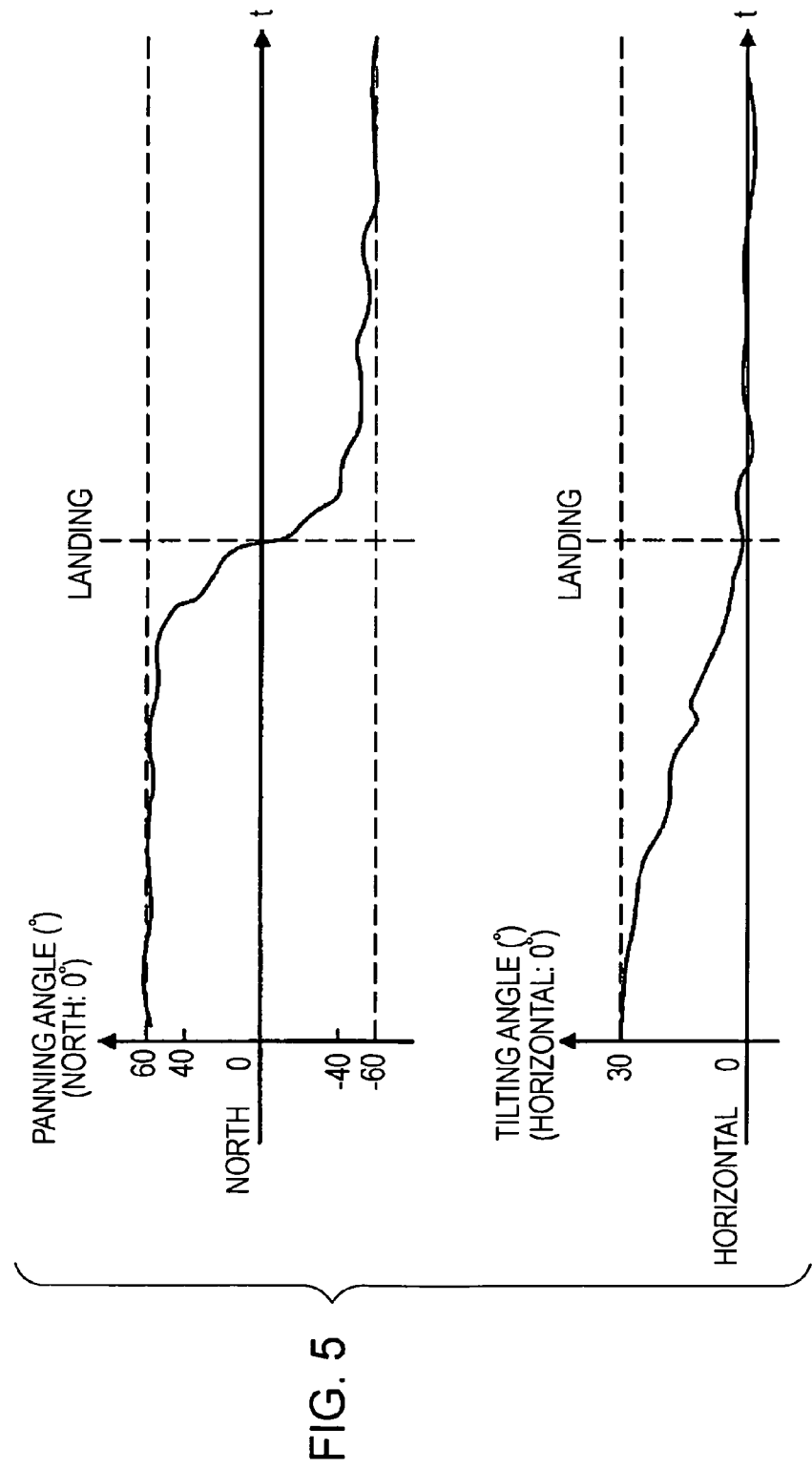
FIG. 5 illustrates operation information which includes a panning angle and a tilting angle.

Referring now to FIG. 4 to FIG. 9, a method of specifying the recorded area of the moving image corresponding to a captured scene will be described. In an example described below, an airplane 1 landing on a runway 2 is captured as a moving image of an object. FIG. 4 illustrates the positional relationship between the video camera 10 and the object. FIG. 5 illustrates operation information including time-series data regarding the panning angle and the tilting angle which vary through the capturing operation.

As illustrated in FIG. 4, the airplane 1, that is, the object, descends from the sky from the right side of the video camera 10, lands on the runway 2 substantially in the front of the video camera 10 and taxis on the runway 2 to the left of the video camera 10. The video camera 10 is panned and tilted, following the movement of the object. The positional relationship is illustrated in FIG. 4 with the top side of the paper sheet being north. The time-series data regarding the panning angle (i.e., direction) and the tilting angle (i.e., elevation angle) are illustrated in FIG. 5 with north being designated as 0° and the horizontal elevation angle being designated as 0°.

According to the operation information illustrated in FIG. 5, the panning angle first changes gradually from +60° to +40°, changes rapidly from +40° to −40° and then changes gradually from −40° to −60°. The tilting angle changes gradually from +30° to 0° for the period in which the panning angle changes from +60° to 0° and is a substantially constant value at 0° for the period in which the panning angle changes from 0° to −60°. Short changes in the panning angle and the tilting angle are caused due to hand movement of an image-capturing person.

Figure 6:
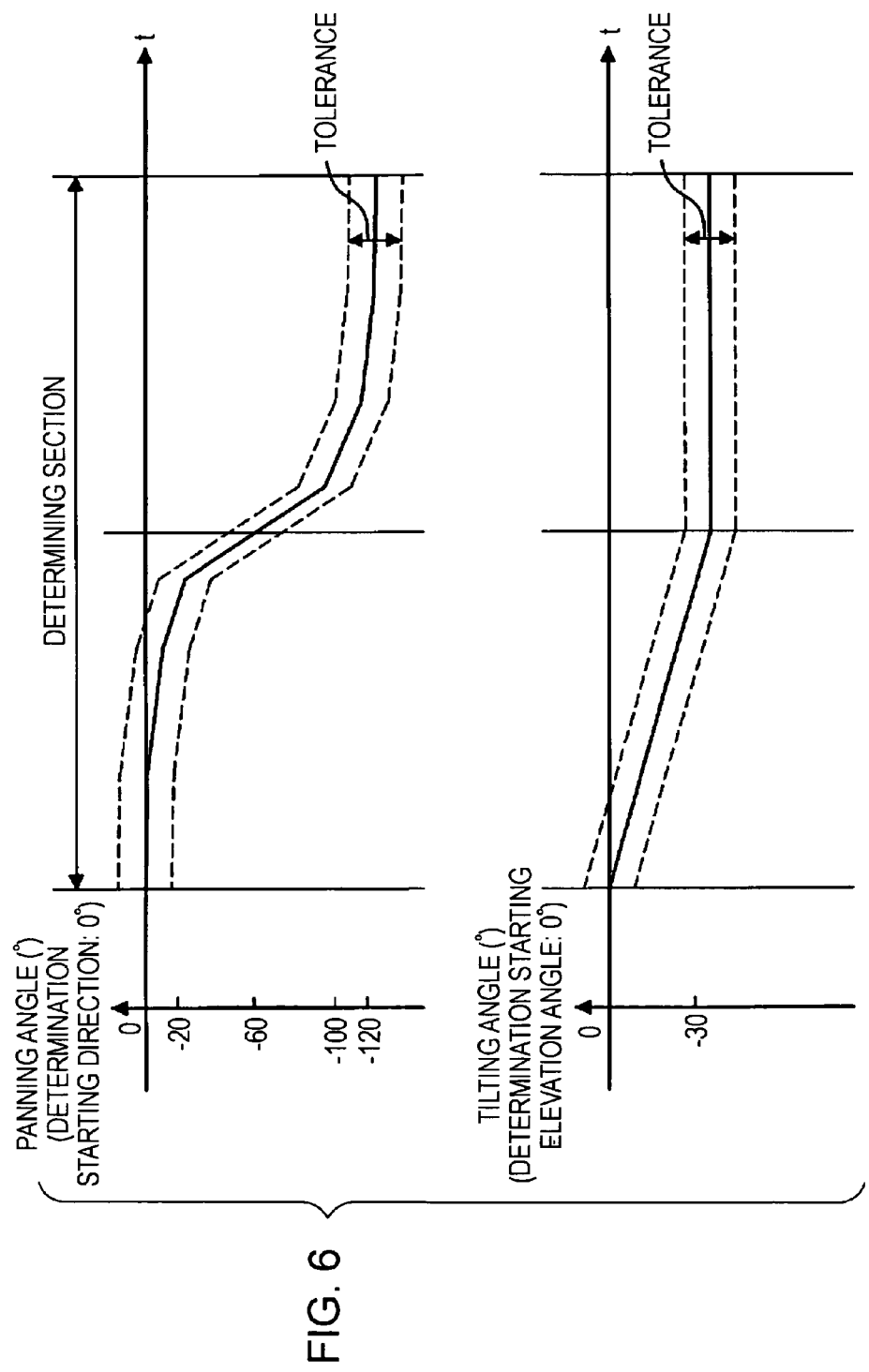
FIG. 6 illustrates comparative operation information which includes a panning angle and a tilting angle.
Figure 7:
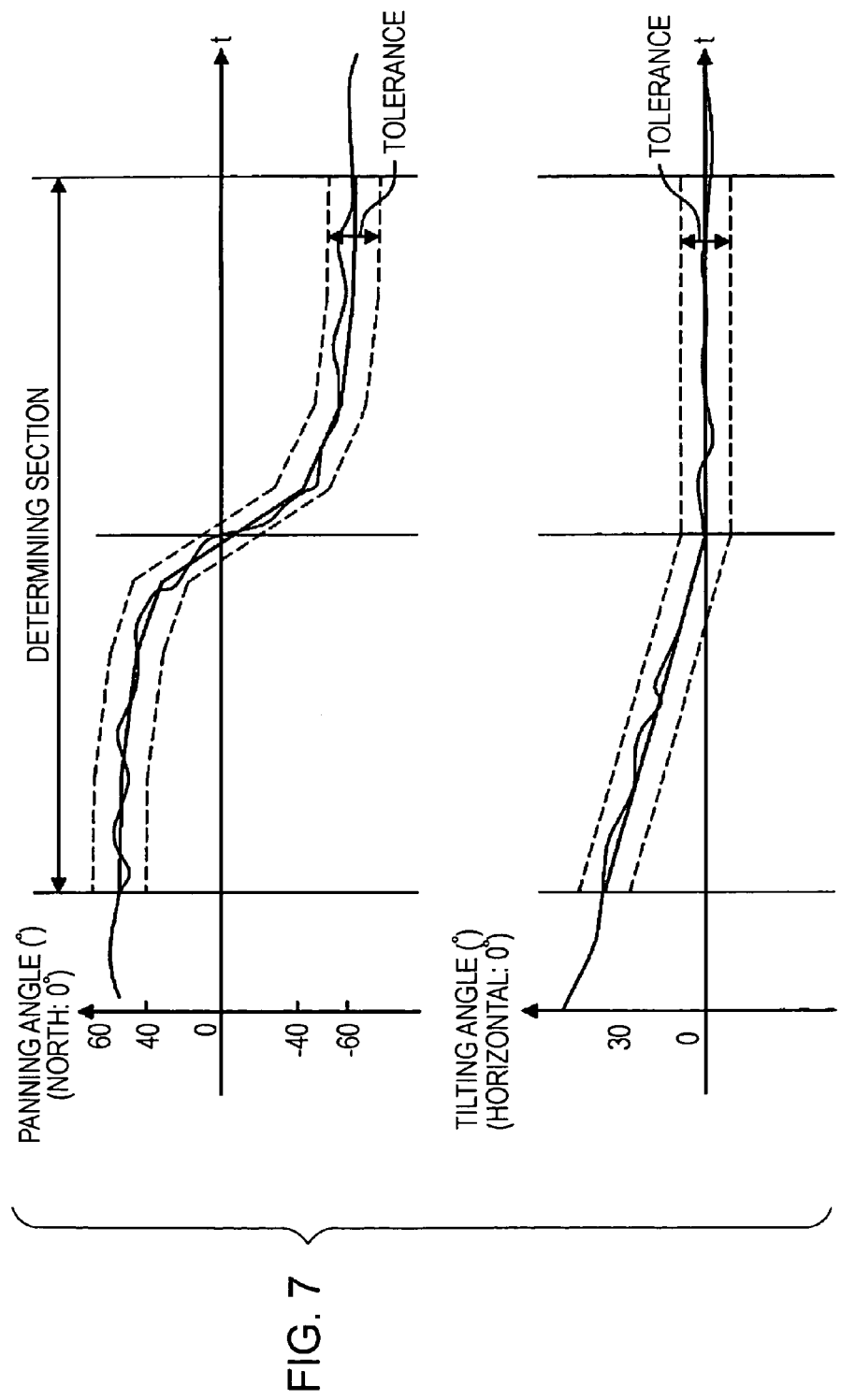
FIG. 7 illustrates a comparison result between the operation information illustrated in FIG. 5 and the comparative operation information illustrated in FIG. 6.

FIG. 6 illustrates comparative operation information including the time-series data of the panning angle and the tilting angle. FIG. 7 illustrates a comparison result between the operation information illustrated in FIG. 5 and the comparative operation information illustrated in FIG. 6.

In the comparative operation information illustrated in FIG. 6, the panning angle (i.e., direction) and the tilting angle (i.e., elevation angle) are 0° at the starting point of the determining section. As illustrated in FIG. 6, in the comparative operation information, the panning angle first changes gradually from 0° to −20°, changes rapidly from −20° to −100° and then changes gradually from −100° to −120°. The tilting angle changes gradually from 0° to −30° for the period in which the panning angle changes from 0° to −60° and is a substantially constant value at −30° for the period in which the panning angle changes from −60° to −120°.

In consideration of the influence of hand movement of the image-capturing person, predetermined tolerance (e.g., ±10°) is set for the panning angle and the tilting angle in the comparative operation information. Here, the tolerance is controlled and set by the user or the video camera 10. If the tolerance is small, specification accuracy of the recorded area of the moving image improves. If the tolerance is increased to some extent, the recorded area of the moving image can be specified even if there is certain influence of the hand movement of the image-capturing person.

The comparative operation information in FIG. 7 is illustrated with the panning angle (i.e., direction) at the start point of a determining section being changed from 0° to +60° and the tilting angle (i.e., elevation angle) being changed from 0° into +30°. In particular, the operation information is compared with the comparative operation information regarding a relative angular change from a referential starting point of the determining section. As illustrated in FIG. 7, in the operation information, both the panning angle and the tilting angle are included in the tolerance of the comparative operation information. In this case, the video camera 10 determines that the operation information corresponds to the comparative operation information. If at least one of the panning angle and the tilting angle deviates even partially from the tolerance of the comparative operation information, it is determined that the operation information of the video camera 10 does not correspond to the comparative operation information.

According to the comparative operation information illustrated in FIG. 6, the recorded area of the moving image can be specified corresponding to the captured scene which has a characteristic where the relative variation of the operation parameter where the value of the starting point of the determining section is a reference value, irrespective of the value of the operation parameter at the starting point of the determining section.

Figure 8:
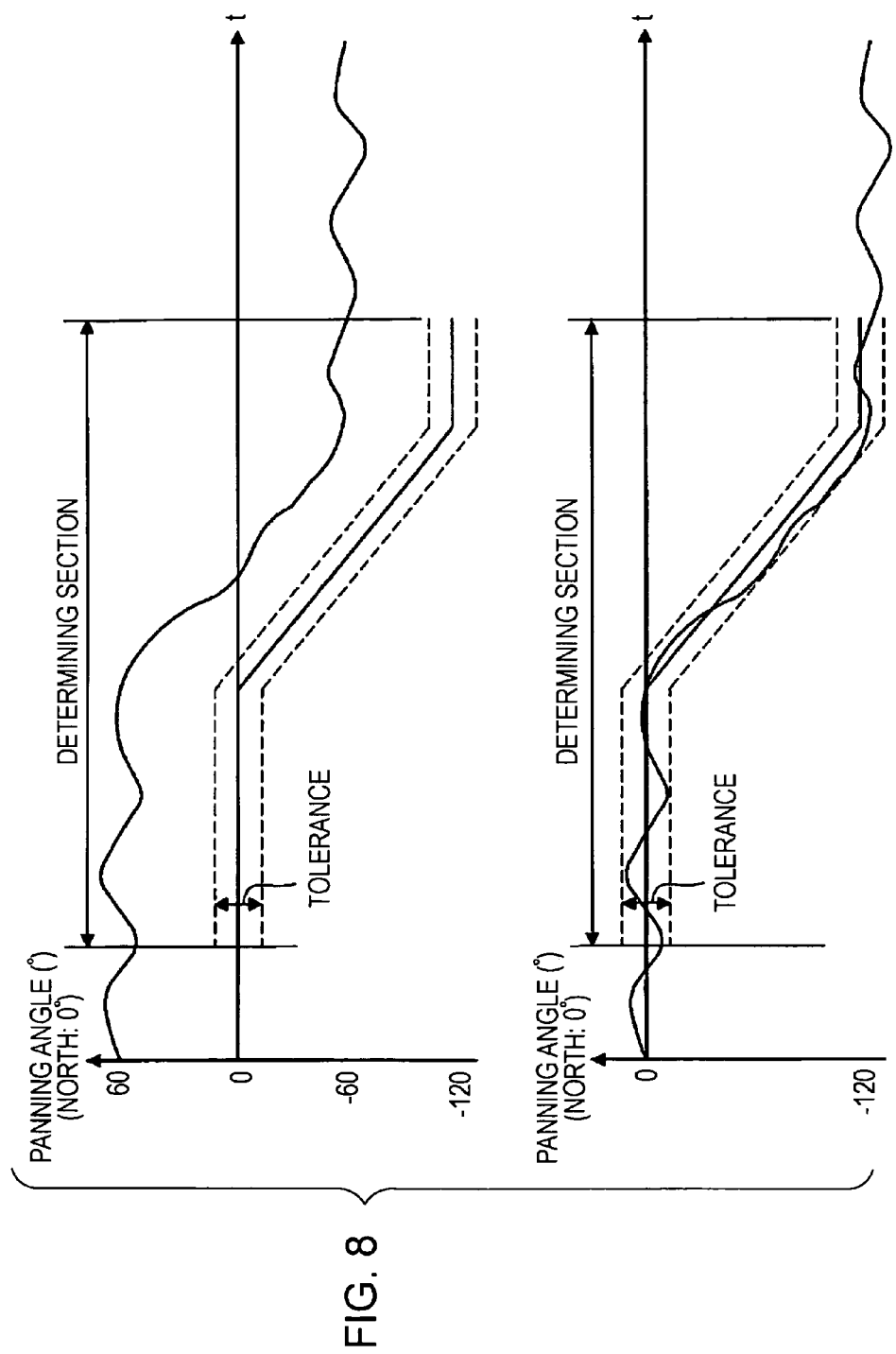
FIG. 8 illustrates a modified embodiment of comparative operation information which includes a panning angle.

FIG. 8 illustrates a modified embodiment of the comparative operation information which includes the panning angle. In the comparative operation information illustrated in FIG. 8, the panning angle (i.e., the direction) at the starting point of the determining section is set to 0°. The comparative operation information illustrated in FIG. 8 is compared with the operation information without converting the panning angle (i.e., the direction) at the starting point of the determining section in accordance with the operation information. That is, the operation information is compared with the comparative operation information in variation of the absolute angle. Accordingly, even if the relative variation of the panning angle with the starting point of the determining section being the reference point corresponds to the comparative operation information, correspondence of the operation information and the comparative operation information is determined in accordance with the panning angle at the starting point of the determining section.

In the example illustrated in FIG. 8, it is determined that upper operation information does not correspond to the comparative operation information since the panning angle of the starting point of the determining section is +60°, and that lower operation information corresponds to the comparative operation information since the panning angle of the starting point of the determining section is about 0°.

According to the comparative operation information illustrated in FIG. 8, the recorded area of the moving image can be specified corresponding to the captured scene which has the characteristic in the relative variation of the operation parameter with the value at the starting point of the determining section being the reference value along with the value of the operation parameter at the starting point of the determining section.

FIG. 9 illustrates a data structure of the comparative operation information. Comparative operation information 1 includes time-series data of the panning angle and the tilting angle. Comparative operation information 2 includes only time-series data of the panning angle. When the comparative operation information 1 is employed, only if the operation information corresponds to the comparative operation information regarding both the panning angle and the tilting angle, it is determined that the operation information corresponds to the comparative operation information. Regarding the comparative operation information 1, the dollying speed and the zoom factor are not considered. If the comparative operation information 2 is employed, only if the operation information corresponds to the comparative operation information regarding the panning angle, it is determined that the operation information corresponds to the comparative operation information. Regarding the comparative operation information 2, the tilting angle, the dollying speed and the zoom factor are not considered.

3. Operation of Information Processing Device

Referring now to FIGS. 10 to 15, an information processing method according to an embodiment of the invention will be described. First, a method of generating comparative operation information will be described with reference to FIGS. 10 to 13. Next, a method of specifying the recorded area of the moving image during recording of the moving image will be described with reference to FIG. 14. Then, a method of specifying the recorded area of the moving image after recording of the moving image will be described with reference to FIG. 15.

Figure 10:
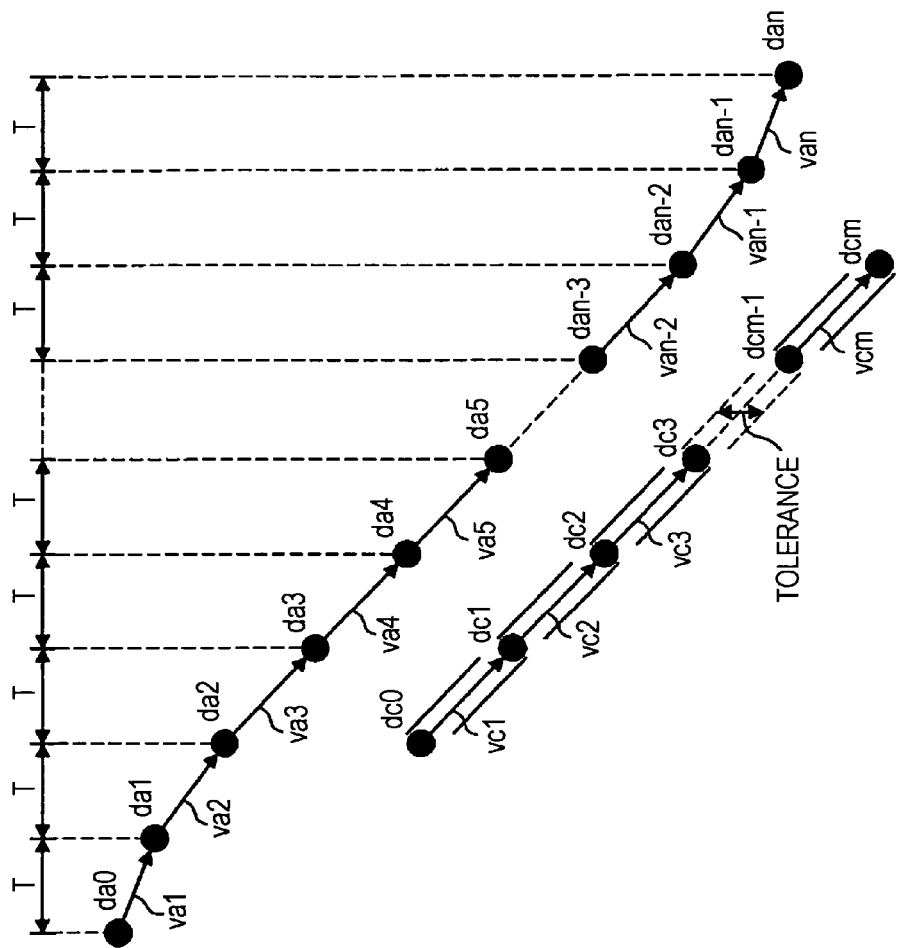
FIG. 10 schematically illustrates structures of operation information and comparative operation information.

FIG. 10 schematically illustrates a configuration of the operation information and the comparative operation information. The operation information is generated as time-series data on the basis of values detected during a recording period of the moving image at a predetermined sampling cycle T (e.g., T=0.1 seconds). For the ease of illustration, the comparative operation information is set as the time-series data having a cycle corresponding to the sampling cycle T.

As illustrated in FIG. 10, the operation information includes data da0 at the start of the recording (ta=0), data dai at the recording period (ta=i) and data dan at the end of the recording (ta=n). The comparative operation information includes data dc0 at the start of the determination (tc=0), data dcj at the determination period (tc=j) and data dcm (m≤n) at the end of the determination (tc=m). Here, the data dai and dcj represent values of each of the operation parameters, such as the panning angle, the tilting angle, the dollying speed and the zoom factor during the recording period ta=i or the determination period tc=j.

Then, vectors va1 to van are generated from the data da0 to dan of the operation information and the comparison vectors vc1 to vcm are generated from the data dc0 to dcm of the comparative operation information. The vector vai is generated from the data dai−1 and dai and the comparison vector vcj is similarly generated from data dcj−1 and dcj. That is, the vector va and the comparison vector vc represent the amount of change of each operation parameters (i.e., the panning angle, the tilting angle, the dollying speed and the zoom factor) for each sampling cycle T.

Tolerance (e.g., an angle error, a speed error and a magnification error) is included in the comparative operation information by the user or the video camera 10. The tolerance may be uniformly set to each operation parameter or may be set to at least some sections of the comparison vectors vc1 to vcm. In this manner, specification accuracy of the recorded area of the moving image corresponding to the captured scene can be controlled in accordance with the situation of the captured scene of interest.

3-1. Generation of Comparative Operation Information

Figure 11A:
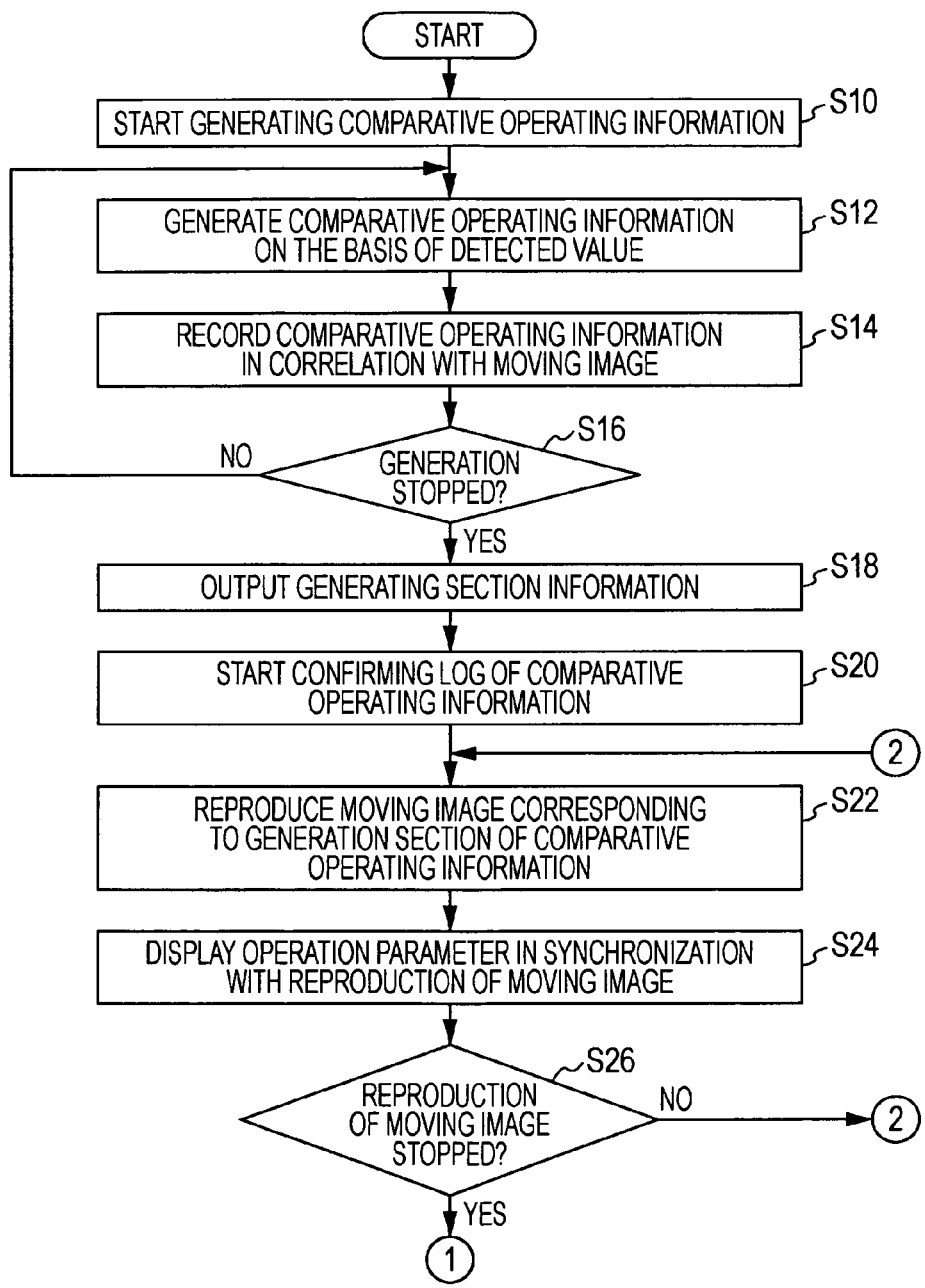
FIG. 11A is a flowchart illustrating a process of generating comparative operation information during recording a moving image.
Figure 11B:
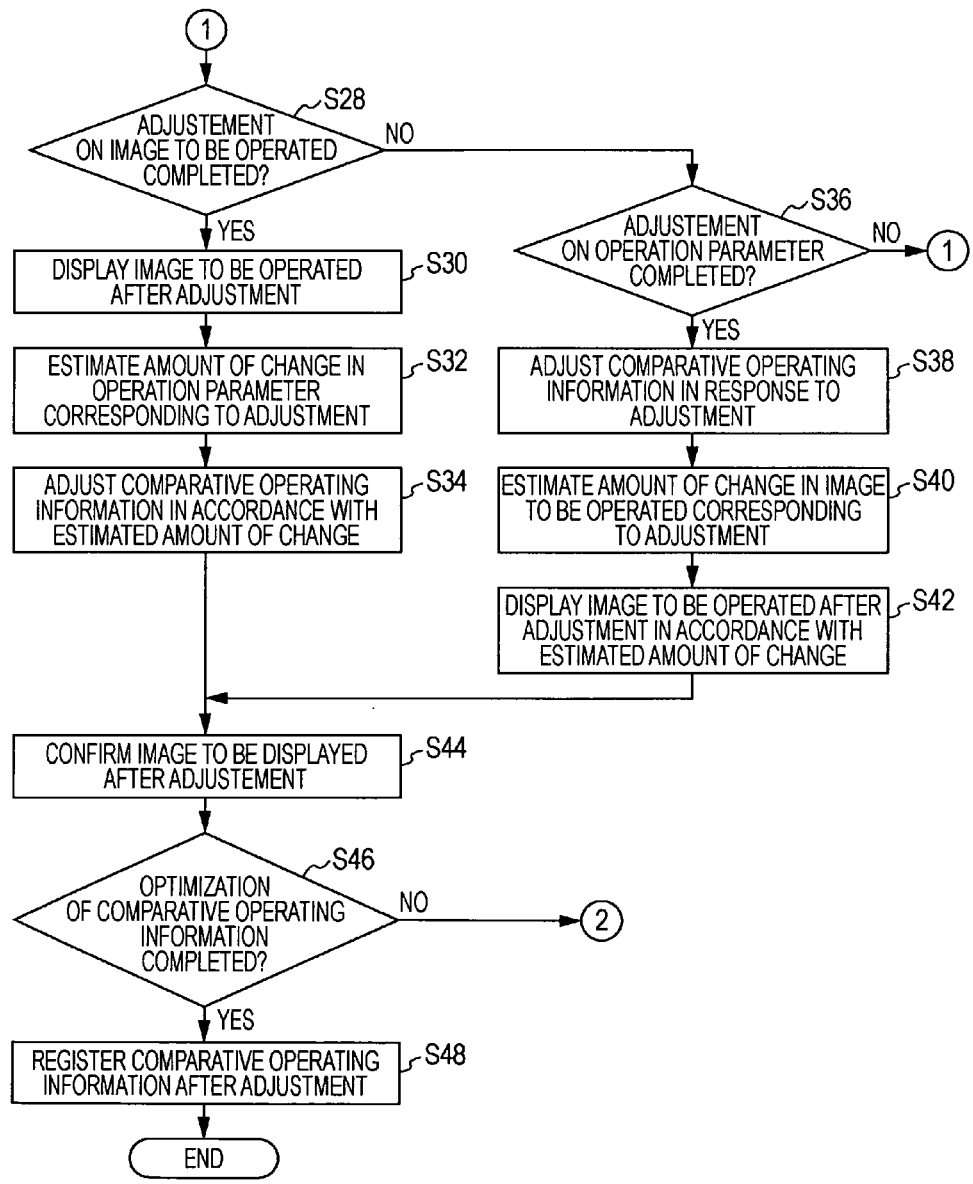
FIG. 11B is a flowchart illustrating a process of generating comparative operation information during recording a moving image.

FIGS. 11A and 11B are flowcharts of a method of generating comparative operation information during recording of the moving image. The control section 12 instructs starting or stopping of the generation to each component when the starting or the stopping of the comparative operation information is instructed via the operation I/F 28 during or before the recording of the moving image.

When the start of the generation is instructed (step S10), the video codec 16 outputs, to the format processing section 30, video data encoded from the video information, and the audio codec 22 outputs, to the format processing section 30, the audio data encoded from the audio information. The operation information processing section 36 generates the comparative operation information regarding the predetermined operation parameter on the basis of detected values from the sensors 34 and from the operation I/F 28 which change through the actual capturing operation (S12). Here, the predetermined operation parameter is previously set by the user or the video camera 10 from among the panning angle, the tilting angle, the dollying speed and the zoom factor.

The operation information processing section 36 outputs generated comparative operation information to the format processing section 30. The format processing section 30 generates predetermined moving image data on the basis of video data, audio data and the comparative operation information. The comparative operation information herein is correlated with the video data and the audio data so as to synchronize with the video data and the audio data. The format processing section 30 outputs the moving image data to the reproduction/recording section 32 and the reproduction/recording section 32 writes the moving image data in the recording medium (S14). The comparative operation information are continuously generated and recorded until the stop of the generation is instructed (S16).

The operation information processing section 36 outputs, to the format processing section 30, generating section information for specifying the generating section of the comparative operation information (S18). The format processing section 30 outputs the generating section information to the reproduction/recording section 32 along with the moving image data and the reproduction/recording section 32 writes the output information in the recording medium.

When the generation of the comparative operation information is completed and the start of the confirmation of the comparative operation information is instructed via the operation I/F 28, the control section 12 instructs start of the confirmation to the reproduction/recording section 32, the format processing section 30, the video codec 16, the audio codec 22 and the operation information processing section 36 (S20).

When the start of the confirmation is instructed, the reproduction/recording section 32 outputs the moving image data to the format processing section 30 sequentially from the moving image data corresponding to the generation starting point on the basis of the generating section information. The format processing section 30 outputs the video data extracted from the moving image data to the video codec 16 and outputs the audio data extracted from the moving image data to the audio codec 22. The video codec 16 outputs, to the display section 18, the video signal decoded from the video data. The audio codec 22 outputs, to the audio output section 24, the audio signal decoded from the audio signal. In this manner, the moving image corresponding to the generating section of the comparative operation information is reproduced (S22).

The format processing section 30 outputs, to the operation information processing section 36, the comparative operation information extracted from the moving image data in synchronization with the reproduction of the moving image. The operation information processing section 36 generates time-series data of the predetermined operation parameter on the basis of the comparative operation information and outputs the data to the display image generating section 26. The display image generating section 26 generates a corresponding image to be displayed and outputs the generated image to the display section 18. The display section 18 displays the image to be displayed in synchronization with the reproduction of the moving image (S24). In this manner, the user can confirm the time-series variation of the operation parameter while reproducing the moving image. A reproduction speed of the moving image may be suitably controlled by the user via the operation I/F 28.

During the confirming operation, the user temporarily stops reproduction of the moving image through the operation I/F 28 (S26) and the time-series data of the temporarily stopped moving image and the operation parameter are displayed on the display section 18. The user can control the time-series data of the temporarily stopped moving image (hereinafter, referred to as the image to be operated) and the operation parameter via the operation I/F 28.

The user can control the comparative operation information by controlling the image to be operated. For example, as illustrated in FIG. 12, when the image to be operated is moved in the horizontal direction on the display area (S28), the display image generating section 26 generates the image to be displayed after the control for displaying the image to be operated at a moved position and outputs the image to the display section 18 (S30). Then, as illustrated later, the operation information processing section 36 controls the comparative operation information regarding the panning angle to an amount of change SP in accordance with displacement δm of the image to be operated. The same description is applied to the control of the comparative operation information regarding the tilting angle.

In this case, the amount of movement of the viewpoint (i.e., a position corresponding to the optical axis direction of the lens) in the horizontal direction of the video camera 10 is detected through an image analysis of the video data in the predetermined recorded area before or after the temporary stop. For example, a static object in the image is specified through an image analysis and the amount of change of the view point movement is detected on the basis of the position change of the static object in the predetermined recorded area. The time-series data regarding the panning angle corresponding to the recorded area is extracted from the comparative operation information and is compared with the amount of change of the view point movement. Then, the amount of change of the panning angle corresponding to the amount of change per unit of view point movement is estimated on the basis of the amount of change of the view point movement and the amount of change of the panning angle (S32). Accordingly, the operation information processing section 36 can estimate the amount of change δP of the panning angle corresponding to the displacement δM of the image to be operated on the basis of the amount of change per unit of the view point movement and can control the comparative operation information regarding the panning angle on the basis of an estimated value of the amount of change (S34).

When the image to be operated is enlarged or reduced on the display area (S28), the display image generating section 26 generates a controlled image to be displayed in order to display an enlarged or reduced image and outputs the generated image to the display section 18 (S30). The operation information processing section 36 then controls the comparative operation information regarding the dollying speed in accordance with the enlargement or reduction amount of the image to be operated. The same description is applied to the control of the comparative operation information regarding the zoom factor.

In this case, the amount of change of a field angle (i.e., a capturing area of the video camera 10) is detected by the image analysis of the video data. For example, a static object in the image is specified through the image analysis and the amount of change of the field angle is detected on the basis of variation in size of the image area occupied by the static object. The time-series data regarding the dollying speed is extracted from the comparative operation information and is compared with the amount of change of the field angle. Then, the amount of change of the dollying speed corresponding to the amount of change per unit of the field angle is estimated on the basis of the amount of change of the field angle and the amount of change of the dollying speed (S32). Accordingly, the operation information processing section 36 can estimate the amount of change of the dollying speed corresponding to an amount of enlargement or reduction of the image to be operated on the basis of the amount of change per unit of the field angle and can control the comparative operation information regarding the dollying speed on the basis of the estimated value of the amount of change (S34).

Figure 13:
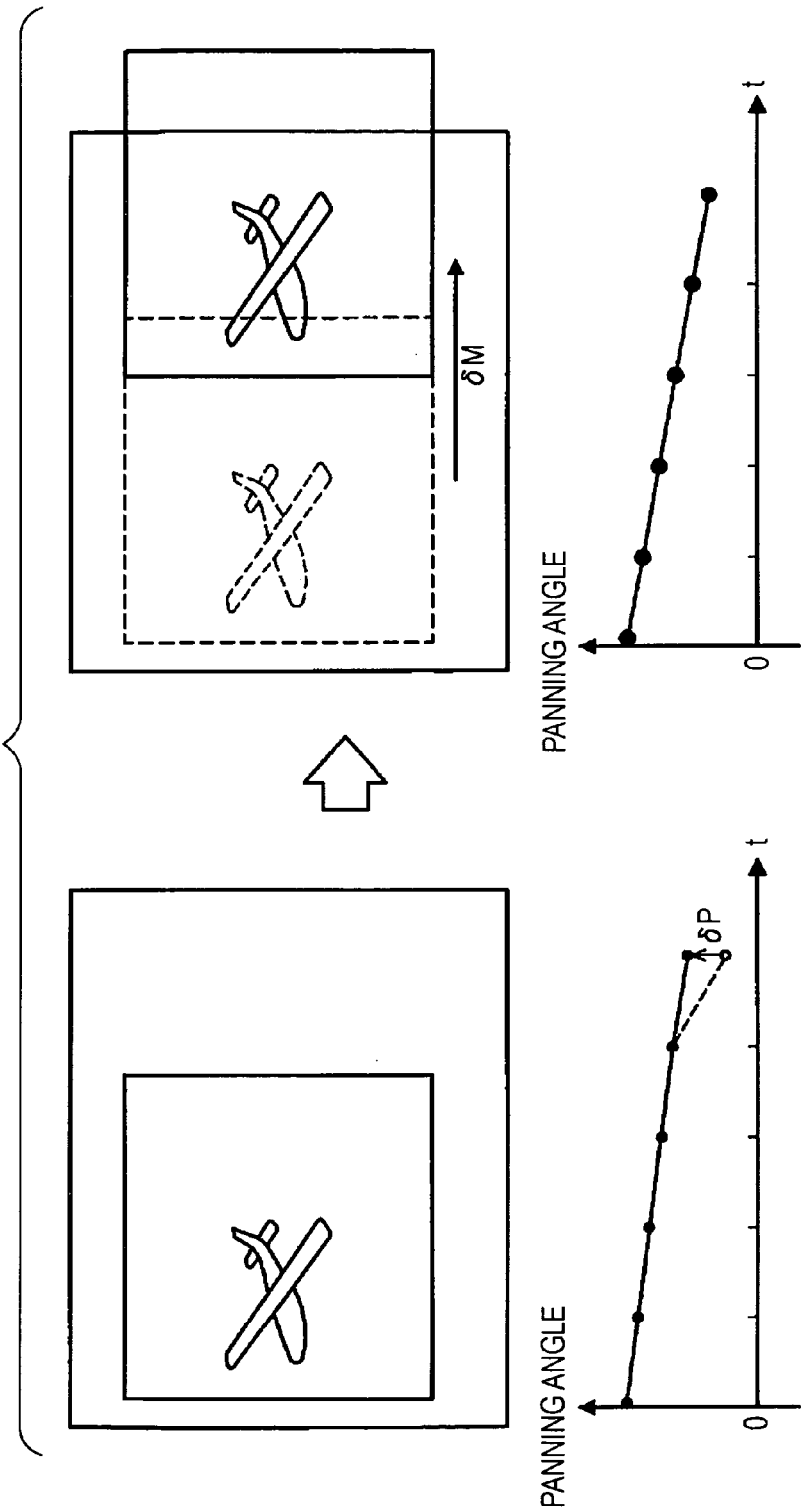
FIG. 13 illustrates a process of generating comparative operation information during recording a moving image.

The user can control the comparative operation information through the control of the time-series data of the operation parameter. For example, as illustrated in FIG. 13, when the data of the specified time is modified on the data for the display regarding the panning angle (S36), the comparative operation information is controlled corresponding to the control of the time-series data of the operation parameter (S38). The operation information processing section 36 then estimates the displacement δM of the image to be operated corresponding to the amount of change δP of the data regarding the panning angle by a method similar to that for the control through the control of the image to be operated (S40). The display image generating section 26 generates the image to be displayed after the control for displaying the image to be operated in the position moved by the estimated displacement δM and outputs the image to the display section 18 (S42).

As described above, when the comparative operation information is controlled through the control by the user, the operation information processing section 36 outputs, to the format processing section 30, the controlled comparative operation information and the display image generating section 26 outputs, to the format processing section 30, the video data corresponding to the controlled display image. Using the controlled comparative operation information and the controlled video data, the format processing section 30 generates controlled moving image data and outputs the data to the reproduction/recording section 32.

When the controlled moving image data is generated, confirmation using the controlled moving image data is resumed (S44). The user can optimize the comparative operation information by repeating the control of the moving image data. When the optimization of the comparative operation information is completed (S46), the user registers, via the operation I/F 28, the comparative operation information and sets tolerance for the comparative operation information. When the registration of the comparative operation information is instructed, the format processing section 30 extracts the comparative operation information from the moving image data and outputs the extracted information to the comparative operation information holding section 38 along with the tolerance and the comparative operation information holding section 38 stores the comparative operation information along with the tolerance (S48).

In this manner, the user can generate the comparative operation information on the basis of the actual operation information during recording of the moving image. Accordingly, the recorded area of the moving image corresponding to the captured scene of interest can be easily specified by having the video camera 10 to hold the comparative operation information generated during recording of the moving image.

In the foregoing description, the case where the comparative operation information is generated during recording of the moving image. The comparative operation information, however, may alternatively be generated directly by editing the time-series data of the operation parameter regardless of the recording of the moving image.

3-2. Specifying Recorded Area during Recording of Moving Image

Figure 14:
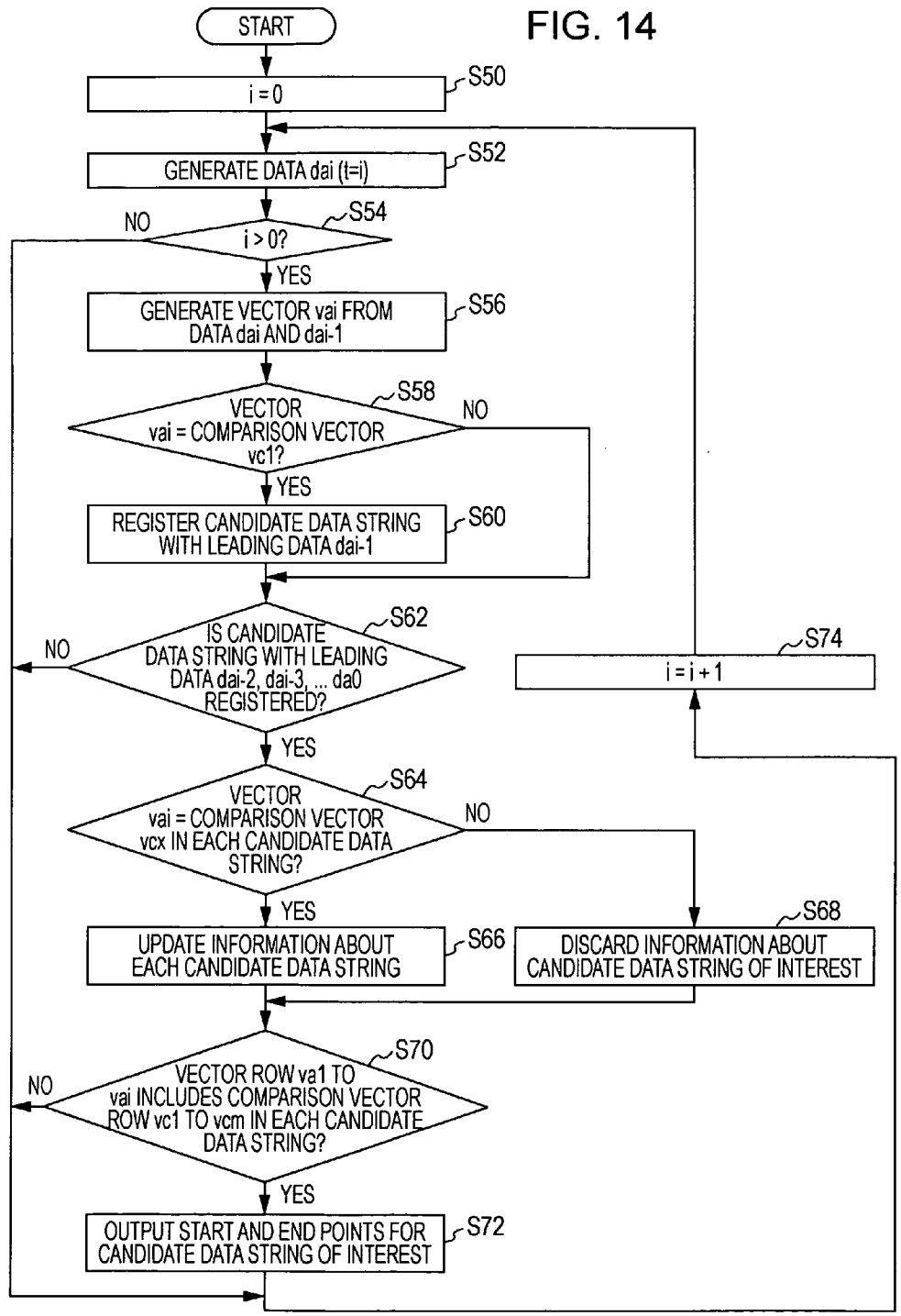
FIG. 14 is a flowchart illustrating a process for specifying a recorded section of a moving image during recording a moving image.

FIG. 14 is a flowchart of a method of specifying the recorded area of the moving image during recording of the moving image. The control section 12 instructs starting or stopping of the recording to each component when the start or stop of the recording of the moving image is instructed via the operation I/F 28.

When the start of the recording is instructed, the video codec 16 outputs, to the format processing section 30, the video data encoded from the video information and the audio codec 22 outputs, to the format processing section 30, the audio data encoded from the audio information. The operation information processing section 36 generates the operation information on the basis of the detected values of the sensors 34 and the operation I/F 28 and outputs the information to the format processing section 30. The format processing section 30 generates the predetermined moving image data from the video data, the audio data and the operation information and outputs the data to the reproduction/recording section 32. The reproduction/recording section 32 writes the moving image data in the recording medium. Hereinafter, the operation of the operation information processing section 36 will be described in detail.

When the start of the recording is instructed, the operation information processing section 36 sets a counter i to an initial value 0 (S50). The operation information processing section 36 generates the operation information (i.e., data da0 at the start of the recording (ta=0) if the recording is just started) (S52). The operation information processing section 36 determines whether or not the counter i excesses 0 (S54). If it is determined that the counter i exceeds 0, the operation information processing section 36 proceeds to step S56. If it is determined that the counter i does not exceed 0, the operation information processing section 36 proceeds to step S74 where the counter i is incremented. Regarding the increment of the counter i, it is assumed that the time corresponding to the sampling cycle T has been elapsed from the initialization of the counter i.

If it is determined that the counter i exceeds 0 at step S54, the operation information processing section 36 generates the vector vai on the basis of the data dai and dai−1 at the time ta=i and i−1 (S56). The operation information processing section 36 then compares the vector vai with a comparison vector vc1 of the comparative operation information (S58). If the vector vai is within the tolerance of the comparison vector vc1, it is determined that the vector vai corresponds to the comparison vector vc1. Here, the operation information processing section 36 determines whether or not there is a possibility that a data string dai−1, dai . . . dan of the operation information with the data dai−1 at the time ta=i−1 being the leading data corresponds to a data string dc1 and dc2 of the comparative operation information.

If the comparative operation information illustrated in FIG. 8 is employed, correspondence between the data dai of the operation information and the data dc0 of the comparative operation information is also confirmed along with the correspondence between the vector vai and the comparison vector vc1. The vector vai and the comparison vector vc1 are compared with each other for each of the operation parameters (e.g., the panning angle and the tilting angle) which are included in the comparative operation information. Only if the vector vai and the comparison vector vc1 correspond with each other in all the operation parameters (except for those not considered), it is determined that there is a possibility that the vector vai and the comparison vector vc1 correspond with each other.

If it is determined that there is a possibility of correspondence, the operation information processing section 36 proceeds to subsequent step S60. If it is determined that there is not a possibility of correspondence, the operation information processing section 36 proceeds to step S62. If the vector vai and the comparison vector vc1 correspond with each other, the operation information processing section 36 registers the data string dai−1, dai . . . dan of the operation information as a candidate data string (S60). Confirmation of the correspondence between the time ta=i−1 corresponding to the leading data dai−1 of the candidate data string and between the vector vai and the comparison vector vc1 is stored in, for example, a memory as information about the candidate data string.

The operation information processing section 36 determines whether or not the candidate data string with data dai−2, dai−3 . . . da0 as the leading data before the time ta=i−1 has been registered (S62). If that candidate data string has been registered, the operation information processing section 36 determines whether or not the vector vai corresponds to the comparison vector vcx that corresponds to each candidate data string among the comparison vector strings vc1 to vcm (S64). If the vector vai is within the tolerance of the comparison vector vcx, it is determined that the vector vai corresponds to the comparison vector vcx. For example, if the counter i=5 and if a candidate data string da2 with the data da2, da3, . . . dan as the leading data has been registered, it is determined whether or not a comparison vector vc3 corresponds to the comparison vector vcx and a vector va5 corresponds to the comparison vector vc3.

That is, each candidate data string is compared in the order of the comparison vector vc1, vc2 . . . vcm each time the counter i is incremented. In the example described above, the candidate data string da2, da3 . . . dan are registered at the time of the counter i=3, the vector va4 is compared with the comparison vector vc2 at the time of the counter i=4 and the vector va5 is compared with the comparison vector vc3 at the time of the counter i=5. Here, the vectors vai and vcx are compared for each operation parameter included in the comparative operation information. Only if all the operation parameters are determined to correspond to one another, it is determined that vectors vai and vcx correspond with each other.

The operation information processing section 36 updates the information about the candidate data string if the vectors vai and vcx correspond with each other (S66). Accordingly, a range in which correspondence has been confirmed between the comparison vector strings vc1 to vcm among the vector va corresponding to the candidate data string is updated. For example, in the example described above, that correspondence is confirmed among the vector strings va3 to va5 of the candidate data string da2, da3, . . . dan and the comparison vector strings vc1 to vc3 is updated as the information about the candidate data strings da2, da3, and . . . . If the correspondence is not confirmed, the operation information processing section 36 proceeds to step S68 where the information about the candidate data string whose vector vai and comparison vector vcx do not correspond with each other is discarded.

The operation information processing section 36 determines whether or not the comparison vector strings vc1 to vcm is included in the vector strings va1 to vai about each candidate data string (S70). On the basis of the information about the candidate data string, it is determined whether or not correspondence is confirmed among the comparison vectors vc1 to vcm of the vector va corresponding to the candidate data string. In the example described above, if correspondence is confirmed between the vector vai and the comparison vector vcm at the counter i=m+2, it is determined that the comparison vector strings vc1 to vcm are included in the vector strings va0 to vai.

The operation information processing section 36 then outputs, to the format processing section 30, information on the basis of the information about the candidate data string of interest by making the starting point and the end point corresponding to the candidate data string as the recorded area information if the comparison vector strings vc1 to vcm are included (S72). In the example described above, the recorded area information including the start time ta=2 and the end time ta=m+2 are output.

The operation information processing section 36 increments the counter i if the time corresponding to the sampling cycle T has elapsed from the last increment in step S74. The operation information processing section 36 then returns to the process in step S52, generates the data dai and proceeds to subsequent steps S54 to S74. The operation information processing section 36 continues the process of the steps S52 to S74 until it receives an instruction for stopping or temporarily stopping the recording of the process from the control section 12.

In the foregoing description, only one kind of comparative operation information has been set. Two or more kinds of comparative operation information (e.g., the comparative operation information 1 and 2) may be employed. In that case, the processes of steps S58 to S72 are performed for each kind of the comparative operation information. In the foregoing description, the sampling cycle T of the operation information and the set cycle of the comparative operation information are identical to each other. If both cycles differ from each other, however, progression of the processes is controlled using, for example, a timer so that both cycles correspond with each other.

With this configuration, the user can specify the recorded area of the moving image corresponding to the captured scene of interest during recording of the moving image by viewing the recorded area information. Accordingly, even if the recorded area is not specified after the recording of the moving image, the recorded area of the moving image corresponding to the captured scene of interest can be specified.

3-3. Specifying of Recorded Area After Record of Moving Image

Figure 15:
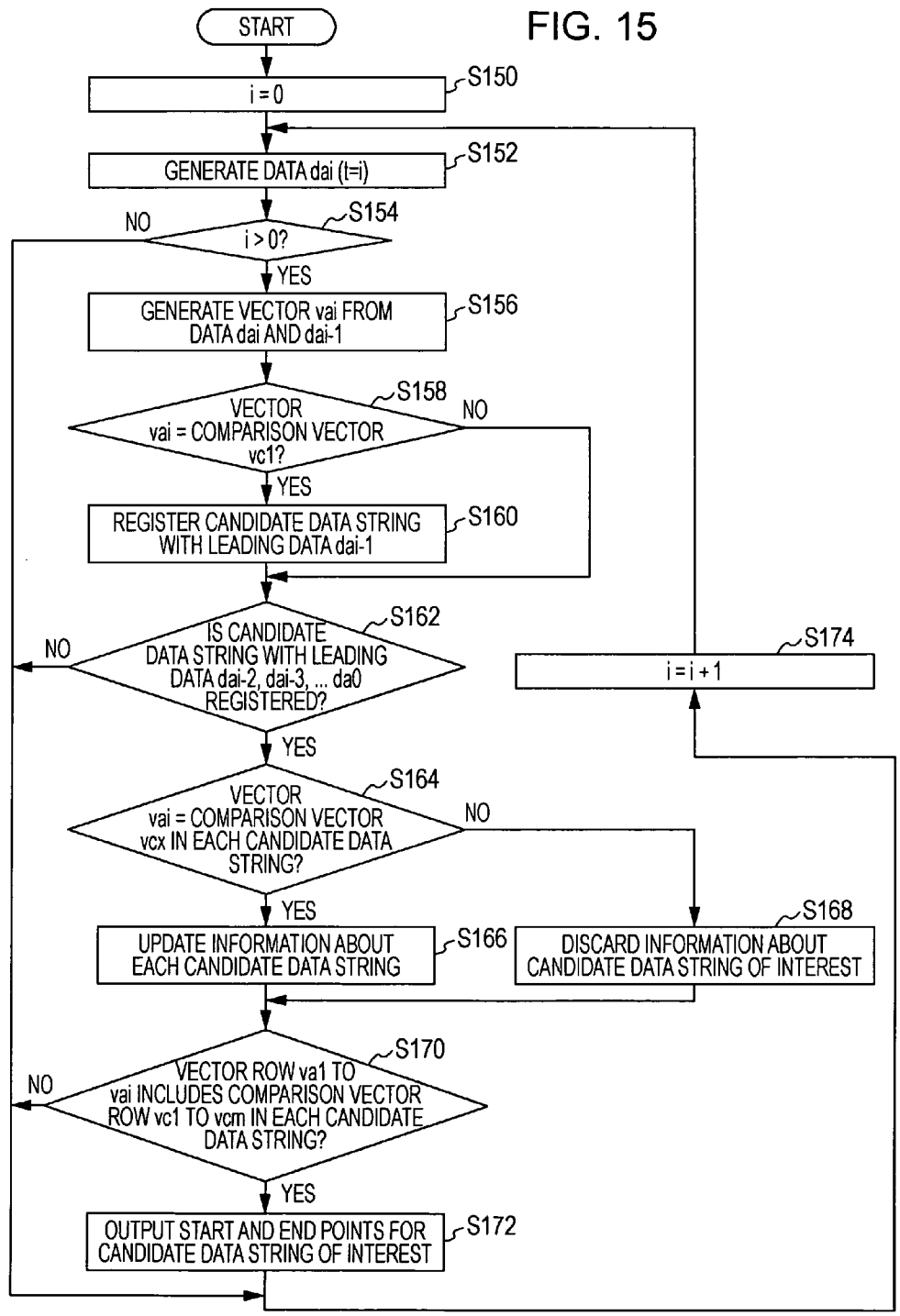
FIG. 15 is a flowchart illustrating a process of specifying a recorded section of a moving image after recording a moving image.

FIG. 15 is a flowchart of a method of specifying the recorded area of the moving image after the recording of the moving image. Also in the method of specifying the recorded area of the moving image after the recording of the moving image, the operation information and the comparative operation information having the configuration illustrated in FIG. 10 are employed. The present method can be implemented by an information processing device which has a reproduction function with or without the function to record moving images.

When the start of the specifying process of the recorded area of the moving image is instructed via the operation I/F 28, the control section 12 instructs start of the processing operation to the reproduction/recording section 32, the format processing section 30, and the operation information processing section 36. When the control section 12 is notified that the trailing end of the moving image data is read by the format processing section 30, the control section 12 instructs stop of the processing operation to the reproduction/recording section 32, the format processing section 30 and the operation information processing section 36.

When start of the specifying process is instructed, the reproduction/recording section 32 outputs the moving image data read from the recording medium to the format processing section 30 and the format processing section 30 outputs the operation information extracted from the moving image data to the operation information processing section 36. The operation information processing section 36 specifies the captured scene on the basis of the comparison of the operation information and the comparative operation information, and outputs recorded area information representing the recorded area of the specified moving image to the format processing section 30. The format processing section 30 outputs the recorded area information to the reproduction/recording section 32 and the reproduction/recording section 32 writes the recorded area information in the recording medium. Description of the operation of the operation information processing section 36 will be omitted since it is the same as that illustrated in FIG. 14 except that the operation information is acquired from the format processing section 30 instead of being generated in step S152.

Accordingly, the user can specify the recorded area of the moving image corresponding to the captured scene of interest after recording of the moving image. Accordingly, the recorded area of the moving image corresponding to the captured scene of interest can also be specified using the comparative operation information which has not been held at the time of recording of the moving image along with the comparative operation information held since the recording of the moving image.

4. Conclusion

As described above, according to the information processing method according to the present embodiment, the comparative operation information representing the predetermined capturing operation is compared with the operation information representing the actual capturing operation and the recorded area which corresponds to the comparative operation information among the operation information is specified. The recorded area of the moving image correlated with the operation information of the specified recorded area is thus specified as a recorded area of the moving image recorded through the predetermined capturing operation. Accordingly, the user can easily specify the recorded area of the moving image corresponding to the captured scene of interest by having the video camera 10 to hold the comparative operation information representing the predetermined capturing operation performed in order to record the captured scene of interest.

Although preferred embodiments of the invention have been described with reference to the accompanying drawings, the invention is not limited to the same. It is apparent to those skilled in the art to conceive various changes and modifications can be made without departing from the scope and spirit of the invention recited in the claims. It is therefore contemplated that those changes and modifications are within the range of the technical scope of the invention.

For example, in the foregoing description, the recorded area of the moving image is specified only through correspondence of the data va0 to vai of the operation information and the data dc0 to dcm of the comparative operation information. However, the recording start position of the moving image may alternatively be specified by partial correspondence of the leading data among the data dc0 to dcm of the comparative operation information (e.g., the data dc0 to dcm/2). With this configuration, a moving image corresponding to a captured scene that is highly possible to be the captured scene of interest can be retrieved rapidly.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
   circuitry configured to:
   compare reference information that corresponds to an amount associated with time-series movement of an imaging device with movement information that corresponds to an amount associated with time-series actual movement of the imaging device upon actual capture of a video image to obtain a comparison result, wherein the reference information includes a tolerance amount of the time-series movement of the imaging device along with the amount associated with the time-series movement, and wherein the reference information is generated prior to a start of the time-series actual movement of the imaging device upon the actual capture of the video image; and output a start point and an end point on a time axis of the video image to specify a scene that corresponds to the reference information in the video image based on the comparison result.

2. The information processing device according to claim 1, wherein the tolerance amount is determined arbitrarily.

3. The information processing device according to claim 1, wherein the tolerance amount is set by a user.

4. The information processing device according to claim 1, in which the circuitry is further configured to compare the reference information with the movement information while the video image is recorded in the actual capture of the video image.

5. The information processing device according to claim 1, in which the circuitry is further configured to compare the reference information with the movement information after the video image is recorded in the actual capture of the video image.

6. The information processing device according to claim 1, further comprising a memory to store the reference information.

7. The information processing device according to claim 1, wherein the time-series actual movement of the imaging device corresponds to at least one of a pan operation, a tilt operation, a dolly operation, or a zoom operation of the imaging device.

8. The information processing device according to claim 1, wherein the imaging device comprises a sensor, and the movement information is obtained based on the sensor.

9. The information processing device according to claim 8, wherein the sensor comprises at least one of acceleration sensors, angular velocity sensors, gravity sensors or direction sensors.

10. The information processing device according to claim 1, wherein the time-series movement of the imaging device corresponds to at least one of a pan operation, a tilt operation, a dolly operation or a zoom operation of the imaging device.

11. An information processing method, comprising:

comparing reference information corresponding to an amount associated with time-series movement of an imaging device with movement information corresponding to an amount associated with time-series actual movement of the imaging device during actual capturing of a video image to obtain a comparison result, wherein the reference information includes a tolerance amount of the time-series movement of the imaging device along with the amount associated with the time-series movement, and wherein the reference information is generated prior to a start of the time-series actual movement of the imaging device upon the actual capture of the video image; and outputting a start point and an end point on a time axis of the video image to specify a scene corresponding to the reference information in the video image based on the comparison result, at least one of the comparing or the outputting being performed by circuitry of an information processing device.

12. A non-transitory computer-readable storage memory having stored thereon a set of computer-executable instructions, that when executed by a processor, cause a computer to perform operations, the operations comprising:

comparing reference information corresponding to an amount associated with time-series movement of an imaging device with movement information corresponding to an amount associated with time-series actual movement of the imaging device during actual capturing of a video image to obtain a comparison result, wherein the reference information includes a tolerance amount of the time-series movement of the imaging device along with the amount associated with the time-series movement, and wherein the reference information is generated prior to a start of the time-series actual movement of the imaging device upon the actual capture of the video image; and outputting a start point and an end point on a time axis of the video image to specify a scene corresponding to the reference information in the video image based on the comparison result.

* * * * *